United States Patent
Steigerwald et al.

(10) Patent No.: US 7,336,059 B2
(45) Date of Patent: Feb. 26, 2008

(54) SYSTEM AND METHOD FOR CHARGING AND DISCHARGING A SUPERCONDUCTING COIL

(75) Inventors: Robert Louis Steigerwald, Burnt Hills, NY (US); Luis Jose Garces, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 52 days.

(21) Appl. No.: 11/273,984

(22) Filed: Nov. 15, 2005

(65) Prior Publication Data

US 2007/0108956 A1    May 17, 2007

(51) Int. Cl.
*G05F 1/62*    (2006.01)
*G05F 1/59*    (2006.01)

(52) U.S. Cl. .................. 323/288; 323/225; 323/266; 323/271

(58) Field of Classification Search ............... 323/222, 323/225, 266, 268, 271, 282, 288, 350, 351; 363/98, 132
See application file for complete search history.

(56) References Cited

U.S. PATENT DOCUMENTS

| | | | |
|---|---|---|---|
| 4,030,007 A * | 6/1977 | Price et al. ................ 318/744 |
| 4,695,932 A | 9/1987 | Higashino | |
| 5,754,024 A * | 5/1998 | Sugiyama ................... 318/701 |
| 5,773,969 A | 6/1998 | Nakayama et al. | |
| 5,917,711 A * | 6/1999 | Shikata et al. ............. 363/16 |
| 5,969,484 A * | 10/1999 | Santi et al. ................. 315/247 |
| 6,031,746 A | 2/2000 | Steigerwald et al. | |
| 6,066,906 A | 5/2000 | Kalsi | |
| 6,111,490 A | 8/2000 | Yanagi et al. | |
| 6,128,174 A | 10/2000 | Ritter et al. | |
| 6,278,212 B1 | 8/2001 | Kalsi | |
| 6,359,365 B1 | 3/2002 | Kalsi | |
| 6,462,962 B1 * | 10/2002 | Cuk ........................... 363/16 |
| 6,798,177 B1 * | 9/2004 | Liu et al. ................... 323/222 |
| 7,099,169 B2 * | 8/2006 | West et al. ................. 363/132 |
| 2002/0190824 A1 | 12/2002 | Masaru et al. | |

FOREIGN PATENT DOCUMENTS

| | | |
|---|---|---|
| DE | 198 50 886 | 5/2000 |
| JP | 56095000 | 7/1981 |
| JP | 57060808 | 4/1982 |
| JP | 57060809 | 4/1982 |
| JP | 63310366 | 12/1988 |
| JP | 01050349 | 2/1989 |
| JP | 04079800 | 3/1992 |
| WO | WO0049704 | 8/2000 |
| WO | WO0103273 | 1/2001 |
| WO | WO0141283 | 6/2001 |
| WO | WO0152391 | 7/2001 |
| WO | WO0152393 | 7/2001 |

* cited by examiner

*Primary Examiner*—Gary L. Laxton
(74) *Attorney, Agent, or Firm*—Fletcher Yoder

(57) ABSTRACT

A system and method for charging and discharging a superconducting coil. The system comprising a boost converter coupled between a low-voltage bus and a high voltage bus, and a buck converter coupled between the high-voltage bus and the coil. The system being configured to charge and discharge the coil without reversing the current while reversing polarity, and to only supply high-voltages when necessary. The system further comprising means to dissipate excess energy during discharge. The method comprising pulse width modulating the solid-state switch of a boost converter to achieve a high-voltage from a low-voltage and then switching solid-state switches of a buck regulator to charge or discharge the coil in a non current reversing, polarity reversing manner.

24 Claims, 5 Drawing Sheets

SYSTEM AND METHOD FOR CHARGING AND DISCHARGING A SUPERCONDUCTING COIL

BACKGROUND

Figure 1:
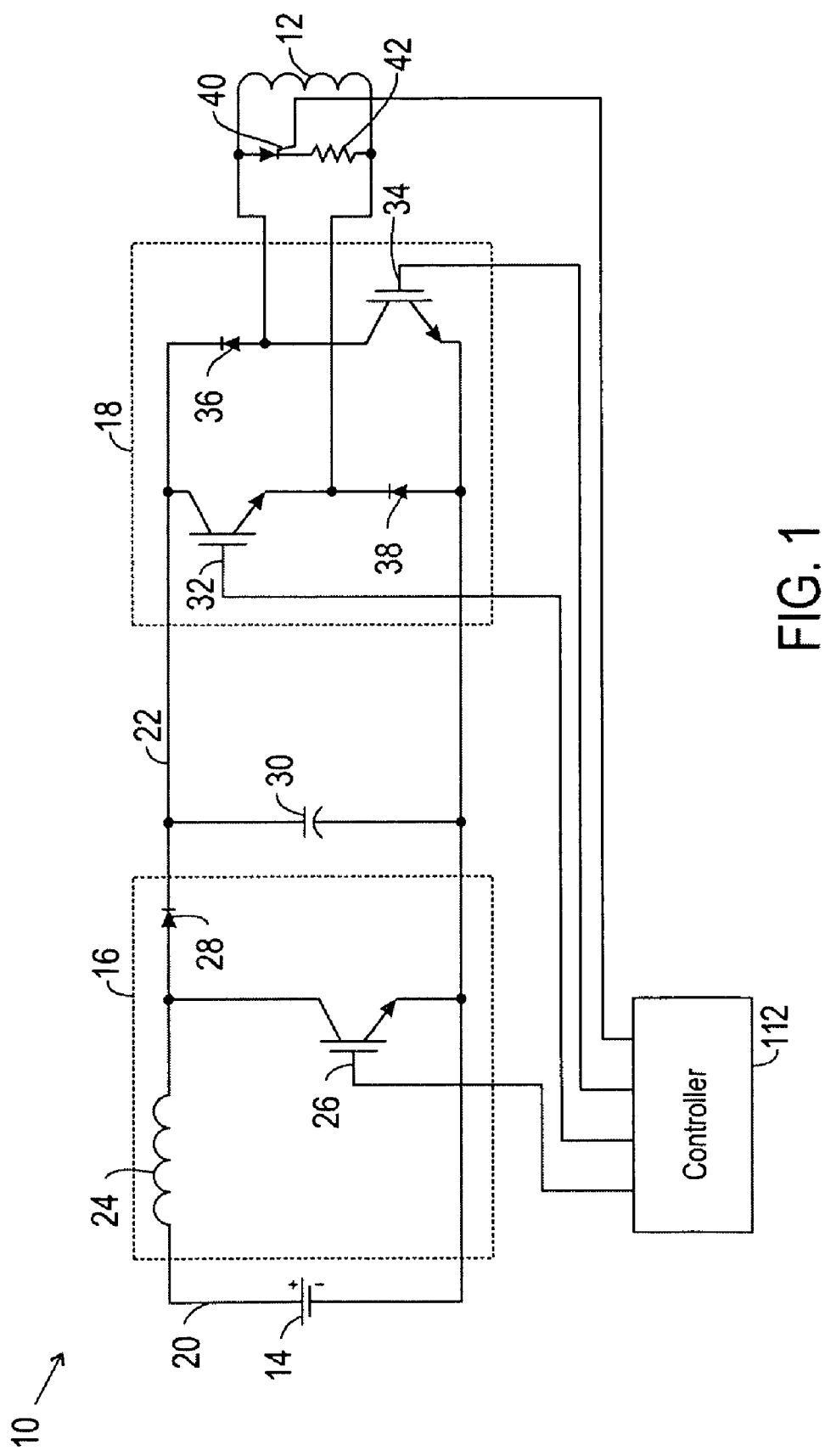

The invention relates generally to power supplies for high inductance, low impedance loads, such as superconducting coils. The invention may be employed, for example, with field exciters for electrical machines and more particularly to machines with large field inductances such as superconductor machines.

High inductance, low impedance machines require high voltages in order to achieve fast field current response. The high voltages are typically only needed for brief periods and it is advantageous to avoid application of high voltages when there is no need to do so. Additionally, in some applications only a low dc voltage is available, and therefore there is a need to produce a high voltage for a load from the low dc voltage source.

Conventional phase controlled thyristor field exciters are heavy and relatively slow. There is a need in the art for improved arrangements for exciting electrical machines that include superconductive coils and windings.

BRIEF DESCRIPTION

The present invention provides efficient, compact and light-weight field exciters enabling variable voltage levels to be achieved from a single low voltage source. Additionally, schemes to reduce switching losses are provided that switch to high voltage only when a fast current change is needed. The lower voltage bus is used during most steady state operations, thus reducing stresses and increasing efficiency.

A light-weight and efficient field exciter with low switching losses is provided that charges and discharges a superconductor coil. The arrangement includes a boost converter in series with a two quadrant buck converter. The boost converter converts a low voltage to a high voltage. A range of voltage levels can be provided to the superconductor coil depending on the particular needs of the coil at a particular time. The boost converter and the buck converter work together to provide the appropriate voltage level to the superconductor load. For example, if fast field response is required, a high voltage can be produced, while if there is no need for a high voltage, the low voltage from the power source can be provided. Additionally, the coil may be discharged without changing the direction of the current.

The invention has several important advantages. First, the light weight and compact design allows it to be used in applications where space is limited and weight is a consideration, such as on aircraft. Additionally, the ability to use only a low voltage source or bus to provide a high voltage to the coil is advantageous where only a low voltage supply is available, such as an aircraft dc bus. The invention also provides very low ripple in the output voltage to prevent quenching in the coil eliminating the need for additional filters, thus reducing size and weight. Finally, switching losses are reduced, making the circuit more efficient.

Several configurations are disclosed that provide additional utility. One configuration provides for redundancy of buck converters which further reduces the ripple in the output. The redundancy also provides a level of security in that if one of the buck converters fails, the other can still operate to provide the appropriate voltage level to the coil. Another configuration provides gross and fine tuning of the voltage that is applied to the coil. This is achieved by stacking a high voltage booster bridge with a low voltage supplier bridge. Yet another configuration allows the multi-level field exciter to regenerate a battery or to put excess power back onto a power supply bus. It should be understood that these configurations are representative configurations and the invention may have many other configurations and applications not specifically described herein.

DRAWINGS

Figure 2:
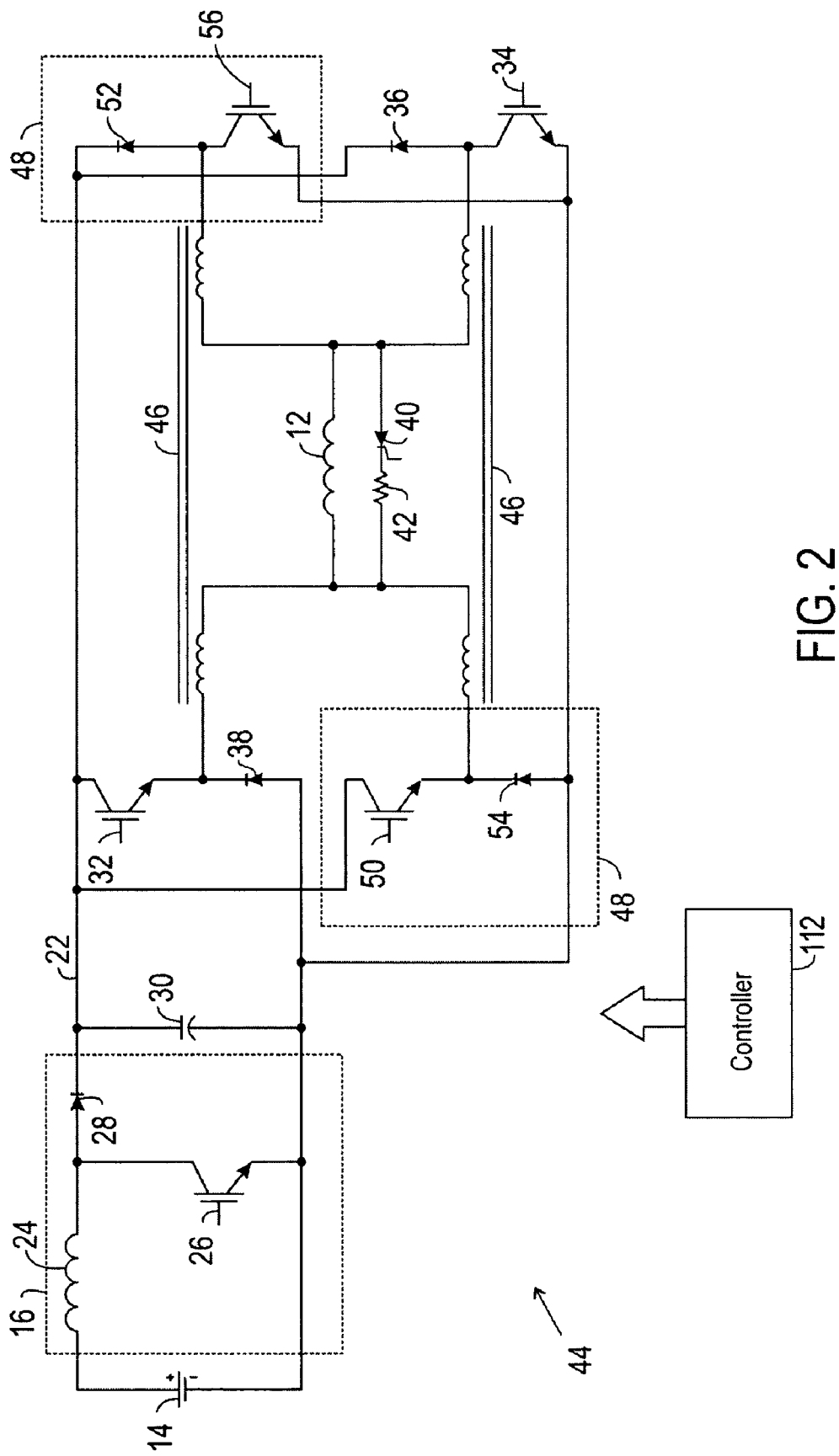
Figure 3:
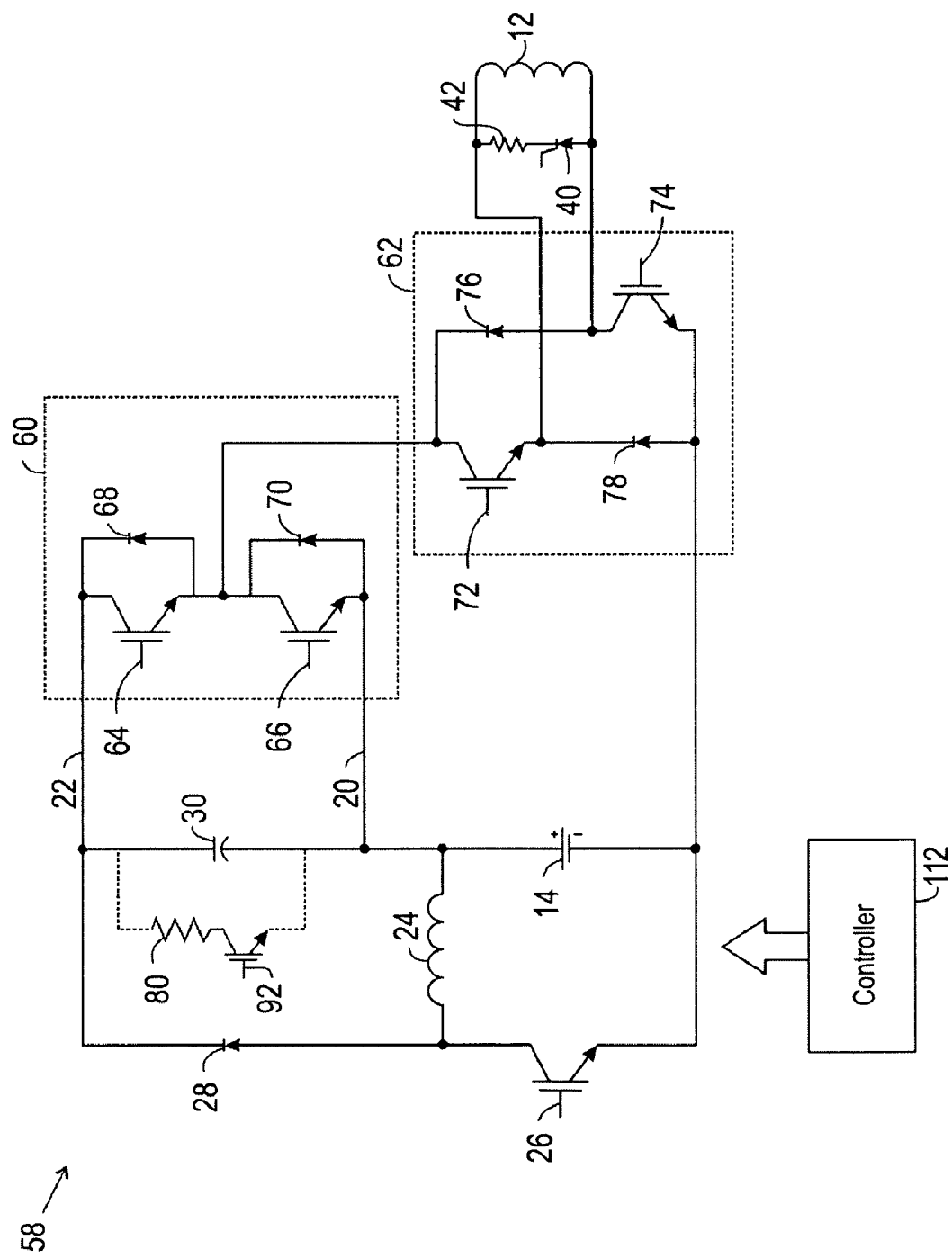
Figure 4:
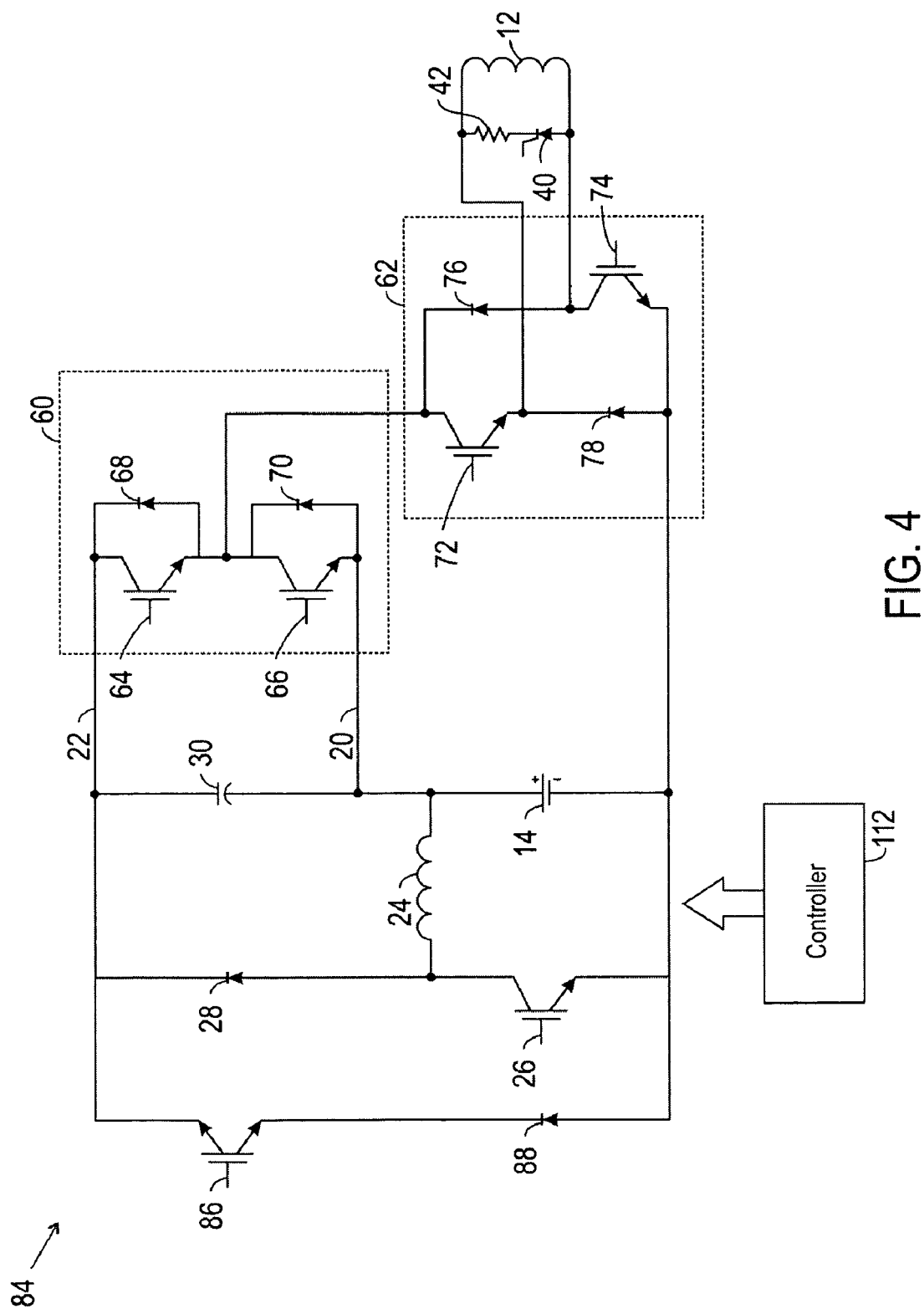
Figure 5:
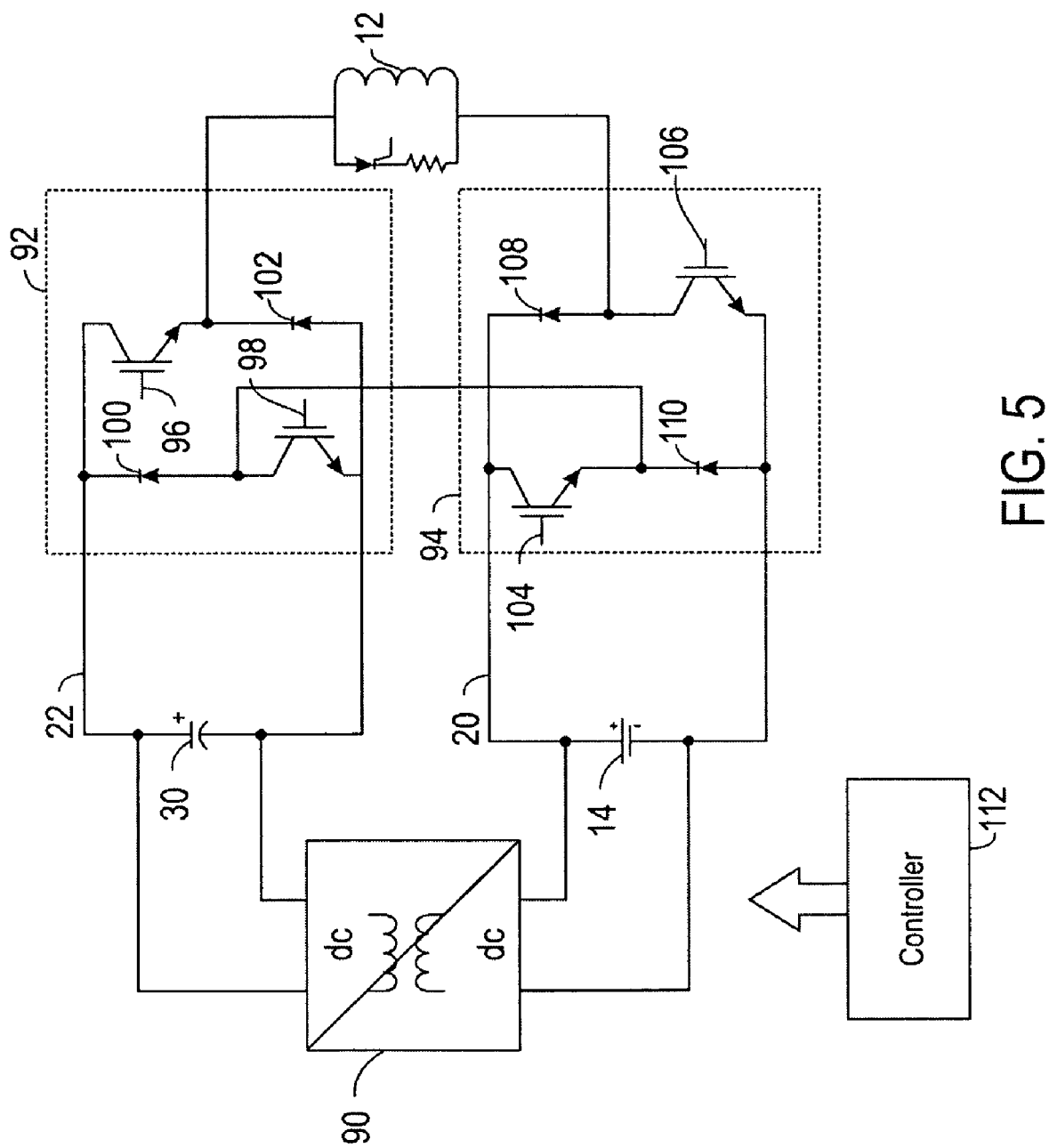

These and other features, aspects, and advantages of the present invention will become better understood when the following detailed description is read with reference to the accompanying drawings in which like characters represent like parts throughout the drawings, wherein:

FIG. 1 schematically illustrates a field exciter for charging and discharging a superconducting coil using a boost converter and a buck converter in accordance with aspects of the present invention;

FIG. 2 schematically illustrates an exemplary redundant circuits configured to charge and discharge a superconducting coil in accordance with aspects of the present invention;

FIG. 3 schematically illustrates an exemplary circuit configured to supply multiple voltage levels to charge and discharge a superconducting coil in accordance with aspects of the present invention;

FIG. 4 schematically illustrates an exemplary switched circuit configured to supply multiple voltage levels to charge and discharge a superconducting coil and to regenerate a power supply in accordance with aspects of the present invention; and FIG. 5 schematically illustrates an exemplary circuit including stacked bridges and a dc/dc converter to convert the low-voltage a high-voltage in accordance with aspects of the present invention.

DETAILED DESCRIPTION

FIG. 1 schematically illustrates the power supply circuit 10 for providing excitation current to a superconducting coil 12. The circuit 10 includes a boost converter 16, and a buck converter 18. The boost converter 16 is configured to convert a low dc voltage to a high dc voltage. The low voltage dc power is supplied on a low-voltage dc bus 20, while the high voltage dc power is output on a high voltage dc bus 22.

The boost converter 16 includes an inductor 24 and a solid state switch 26. The switch 26 is coupled across the dc bus and may be switched, typically in a pulse width modulated regime, to convert electrical power from the low voltage bus 20 to a higher voltage that is applied to the high voltage dc bus 22 as described below. A capacitor 30 is electrically coupled in parallel to the solid state switch 26 and stores the higher voltage. A diode 28 prevents flow of current back from the high voltage dc bus 22 to the boost converter 16.

The buck converter comprises a first buck converter solid-state switch 32, a second buck converter solid-state switch 34, and a pair of flyback diodes 36, 38 coupled around the switches. The coil is charged or discharged according to the switching of first and second buck converter solid-state switches 32, 34. As will be appreciated by those skilled in the art, in the illustrated embodiment, the buck converter is a two quadrant converter, meaning that the first and second buck converter switches are switched in a non current reversing, but voltage polarity reversing manner.

During normal operation, the boost converter 16 is coupled to a dc power source 14. The dc power source 14 is shown as a battery in the figures, but may be any low voltage source. As shown, a controller 112 is electrically connected to provide control signals to the gates of switch 26 of the boost converter 16, and to switches 32 and 34 of the buck converter 18 to provide the voltages required to excite the coil 12. In particular, pulse width modulation (PWM) of a boost solid-state switch 26 by the controller 112 builds up a desired high-voltage in the capacitor 30 for the high voltage dc bus 22. When charging the coil 12, the capacitor 30 discharges to supply voltage to the buck converter.

In order for the full high voltage to be supplied to the coil the controller 112 switches the first buck converter solid-state switch 32 and the second buck converter solid-state switch 34 together. If either the first and second buck converter solid-state switches is switched off and on repeatedly for each cyclic switching of the other of the switches, the level of voltage supplied to the coil 12 is reduced. Additionally, controller 112 may alternate switching the first and second buck converter solid-state switches in order to distribute switching losses. The field current of the coil 12 can be controlled using a well-known current hysteresis band control technique or in any other suitable technique.

The first and second buck converter solid-state switches 32, 34 are also used to discharge the coil 12. This is accomplished by controller 112 switching them in a manner that reduces the voltage applied to the coil 12. The coil 12 attempts to maintain a constant current, and the polarity across the coil 12 reverses. However, as mentioned above, the direction of current flow from the buck converter 18 does not reverse.

The capacitor 30 charges when the coil 12 discharges. If the capacitor is unable to handle the discharge, the controller 112 may turn on a solid state switch 40, which allows a braking resistor 42 connected in parallel to the coil 12 to dissipate the excess power as heat. In particular, the switch 40, which may be, for example, a thyristor, can be turned on during such a discharge period to dissipate charge by resistive loss through the resistor 42. During normal operation or a charging period the thyristor 40, which may be controlled by the same controller 112 as switches 26, 32 and 34, is placed in a non-conducting state, so that the braking resistor 42 does not drain power from the circuit.

Various benefits are provided by the field exciter circuit 10 described above. For example, the field exciter circuit 10 enables high-voltage to be produced from a low voltage supply. Producing the high voltage from a low voltage has several advantages. First, it allows for field excitation of superconducting coils where only a low voltage is available. Second, the high voltage may be produced only as needed, thus reducing stresses and switching losses on the circuit and its components.

In addition, the boost converter solid-state switch 26 is switched at a high frequency (e.g. 100 kHz) allowing the boost inductor 16 to be small, thus reducing the size and weight of the field exciter. The lighter weight and smaller size as compared to conventional thyristor controlled field exciter circuits provides significant benefits. The buck converter solid-state switches are also switched at a high frequency (e.g. 100 kHz) by controller 112. This provides a faster response and very low ripple in the output voltage. Ripple decreases the efficiency of the circuit and can potentially cause quenching of the coil. Finally, controller 112 may switch the buck converter solid-state switches in an alternating manner. Such switching distributes the switching losses, thus reducing switching loss by preventing the switches from accumulating excessive thermal energy.

It should be noted that, while reference is made herein to the use of thyristors as controllable switches, the invention may employ and control other switches as well, such as GTOs, IGBTs, and so forth. Certain switches of this type may offer an additional advantage that they can be turned off at will, without requiring the current to decay to zero. This may allow control to be re-engaged sooner after having fired the power switch. With a superconducting coil, the current decay to zero may require some delay, depending on the resistor value used to discharge it.

FIG. 2 illustrates a redundant exciter circuit 44 similar to the exciter illustrated in FIG. 1 except that the field exciter has a redundant buck converter 48. The redundant buck converter 48 comprises first and second redundant solid-state switches 50, 52, and first and second redundant flyback diodes 54, 56. An interface reactor 46 allows the redundant buck converter 48 to operate in parallel with the first buck converter. During normal operation, controller 112 operates the two buck converters 180 degrees out of phase from each other. The lines connecting controller 112 to the switches have been eliminated for the sake of clarity.

The redundant exciter circuit 44 maintains all of the advantages of the configuration described in FIG. 1, but also further reduces ripple. As described previously, this increases the efficiency and reduces the potential for quenching in the coil 12. Furthermore, the redundant exciter circuit 44 may be more suitable to certain applications where the system is under particular reliability demands. In such instances, the redundancy allows for the failure of one of the buck converters, while the other continues in operation. The failure of one of the buck converters would increase the ripple in the coil as opposed to the operation of both buck converters 180 degrees out of phase. The increased ripple could be used as an indicator that one of the buck converters is no longer operating properly.

FIG. 3 illustrates a multilevel field exciter circuit 58. The multilevel field exciter circuit 58 comprises a high voltage booster bridge 60 and a low voltage supplier bridge 62. The multilevel field exciter circuit allows the coil 12 to be supplied with any voltage level necessary between the voltage level of the high voltage bus 22 and low voltage bus 20. As in the other configurations, a boost converter is used to achieve the high voltage level of the high voltage bus 22.

The high voltage booster bridge 60 is coupled to the high voltage bus 22, the low voltage bus 20 and the low voltage supplier bridge 62. The high voltage booster bridge comprises a first booster solid-state switch 64, a discharge solid-state switch 66, and first and second booster flyback diodes 68, 70. The low voltage supplier bridge 62 is coupled to the low voltage bus 20, the coil 12 and the high-voltage booster bridge. The low voltage supplier bridge comprises a first supplier solid-state switch 72, a second supplier solid-state switch 74 and first and second supplier flyback diodes 76, 78. As in other configurations, the controller 112 is connected to the gates of the various solid state switches, however, the lines connecting the controller 112 with the various switches have been eliminated for the sake of clarity.

As mentioned above, the multilevel field exciter circuit 58 can be used to supply the coil 12 with any voltage level between the voltage level of the high voltage bus 22 and the low voltage bus 20. To supply the coil 12 with the maximum voltage level controller 112 turns on the booster solid-state switch 64 while the first and second supplier solid-state switches 72, 74 are on. The discharge solid-state switch 66 of the high voltage booster bridge 60 remains off. There are multiple ways to achieve voltage levels between the high voltage level and the low voltage level. Gross control of the voltage level supplied to the coil 12 may be performed by the controller 112 PWM switching the booster solid-state switch 64, while switching first and second supplier solid-state switches 72, 74 on. Fine control may be achieved by the controller 112 PWM switching the first and second supplier solid-state switches 72, 74. The key is the voltage supplied to the coil 12 is controlled by the controller 112 switching the various solid-state switches and depends upon the load at the particular time.

The discharge solid-state switch 66 and the first booster flyback diode 68 are used to discharge the coil 12. In order to discharge the coil 12, controller 112 turns on the discharge solid-state switch 66 and turns off the booster solid-state switch 64 and the first and second supplier solid-state switches 72, 74. The field coil can then drain to the capacitor 30. Again, the discharge occurs without changing the direction of current. Only the polarity changes across the coil 12.

As described above, the coil 12 can also be discharged to a braking resistor 42 connected in parallel with the coil. The multilevel exciter circuit 58 additionally includes an optional dissipating resistor 80 and dissipating solid-state switch 82. The dissipating resistor 80 can be used when the capacitor 30 cannot absorb the charge when the coil 12 is discharging. When the dissipating solid-state switch 82 is placed in a conducting state by controller 112, the dissipating resistor 80 dissipates the excess charge in the form of heat.

The multilevel exciter circuit 58 provides the benefits described above such as reduced ripple, and low size and weight, and reduced switching losses. Additionally, the multilevel exciter circuit 58 allows for fine control and gross control of the voltage supplied to the coil 12. One advantage such gross and fine control over the voltage provides is that component wear and tear is reduced because high voltage will only be used when necessary.

FIG. 4 illustrates a regenerative circuit. The function and structure of the regenerative circuit 84 is identical to the multilevel exciter circuit 58 except that the regenerative circuit 84 has a regeneration solid-state switch 86 and a regeneration solid-state flyback diode 88. The regeneration solid-state switch 86 and the regeneration flyback diode 88 are coupled in parallel to the boost converter and act as a buck converter to reduce the voltage from the high voltage bus 22 to the level of the power supply or system bus. Regeneration occurs when the coil 12 is discharging.

FIG. 5 illustrates a multilevel exciter using a dc/dc converter 90 to convert a low voltage to a high voltage. The dc/dc converter 90 is coupled between the low voltage bus 20 and the high voltage bus 22. The stacked bridges are buck converters, a high voltage bus converter 92 and a low voltage bus converter 94, each having a pair of solid-state switches and respective flyback diodes. The gates of the switches are connected to controller 112. The lines connecting controller 112 to the gates have been eliminated for the sake of clarity. The switches are PWM switched by controller 112, as previously described, to provide the coil 12 with the necessary voltage. For example, in order to supply the coil 12 with the full high voltage from the high voltage bus, the controller 112 places all of the solid-state switches in a conductive state. In order to discharge to the capacitor 30, the controller 112 places both the first high voltage bus solid-state switch 96 and the second high voltage bus solid-state switch 98 in a non-conductive state, while the first low voltage bus solid-state switch 104 and the second low voltage solid-state switch 106 are placed in a conductive state. Current flows from the coil through both of the low voltage bus converter solids-state switches and the low voltage bus flyback diodes, and through the first high voltage bus flyback diode 100 to the dc-link capacitor 30.

This configuration provides many of the same advantages of the circuits previously described. For example, if the dc/dc converter were bi-directional, it could be used to regenerate the system bus. Additionally, high voltages can be achieved from a low voltage source/bus and a range of voltages can be provided to the coil according to the needs of at the time.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for charging and discharging a superconducting coil, comprising:
    a boost converter coupled to a low-voltage bus and a high-voltage bus and configured to boost voltage from a low-voltage to a high-voltage;
    an energy storage element coupled across the high-voltage bus;
    a redundant, two quadrant buck converter coupled to the high-voltage bus, the buck converter including an interface reactor and parallel pairs of solid-state switches and respective flyback diodes; and,
    a controller switching the solid state switches in a non-current reversing, polarity reversing mode to selectively charge the coil from the energy storage element and discharge the coil to the energy storage element.

2. The system of claim 1, wherein the boost converter comprises an inductor and a solid state switch.

3. The system of claim 2, wherein the inductor is coupled in series with a power source and the solid state switch is coupled in parallel with the power source.

4. The system of claim 1, further comprising a braking element coupled in parallel with the coil.

5. The system of claim 4, wherein the braking element comprises a resistor in series with a controllable switch.

6. A system for charging and discharging a superconducting coil, comprising:
    a boost converter coupled to a low-voltage bus and a high-voltage bus and configured to boost voltage from a low-voltage to a high-voltage;
    an energy storage element coupled across the high-voltage bus;
    a low-voltage supply bridge coupled to the low-voltage bus and including a pair of switches and flyback diodes;
    a high-voltage booster bridge coupled to the high-voltage bus and to the low-voltage supply bridge and including a pair of solid-state switches and respective flyback diodes; and
    a controller switching the pair of switches of the supply bridge and pair of solid state switches of the booster bridge in a non-current reversing, polarity reversing mode to selectively charge the coil from the energy storage element at voltages between the low-voltage and a sum of the low and high-voltages, and discharge the coil to the energy storage element.

7. The system of claim 6, wherein the boost converter comprises an inductor and a solid state switch.

8. The system of claim 7, wherein the inductor is coupled in series with a power source and the solid state switch is coupled in parallel with the power source.

9. The system of claim 7, further comprising a braking element coupled in parallel with the coil.

10. The system of claim 9, wherein the braking element comprises a resistor in series with a controllable switch.

11. A system for charging and discharging a superconducting coil, comprising:
- a boost converter coupled to a low-voltage bus and a high-voltage bus and configured to boost voltage from a low-voltage to a high-voltage;
- a buck regulator coupled to the boost converter and to the high and low-voltage buses and configured to return energy to a system bus;
- an energy storage element coupled across the high-voltage bus;
- a low-voltage supply bridge coupled to the low-voltage bus and including a pair of switches and flyback diodes;
- a high-voltage booster bridge coupled to the high-voltage bus and to the low-voltage supply bridge and including a pair of solid-state switches and respective flyback diodes; and
- a controller switching the pair of switches in the supply bridge and the pair of solid state switches in the booster bridge in a non-current reversing, polarity reversing mode to selectively charge the coil from the energy storage element at voltages between the low-voltage and a sum of the low and high-voltages, and discharge the coil to the energy storage element.

12. The system of claim 11, wherein the boost converter comprises an inductor and a solid state switch.

13. The system of claim 12, wherein the inductor is coupled in series with a power source and the solid state switch is coupled in parallel with the power source.

14. The system of claim 11, further comprising a braking element coupled in parallel with the coil.

15. The system of claim 14, wherein the braking element comprises a resistor in series with a controllable switch.

16. A system for charging and discharging a superconducting coil, comprising:
- a dc/dc converter coupled to a low-voltage bus and a high-voltage bus and configured to convert a low-voltage to a high-voltage;
- an energy storage element coupled across the high-voltage bus;
- a first two quadrant buck converter coupled to the high-voltage bus, the buck converter including a pair of solid-state switches and respective flyback diodes;
- a second two quadrant buck converter coupled to the low-voltage bus, the buck converter including a second pair of solid-state switches and respective flyback diodes; and
- a controller switching the first and second two quadrant buck converters in a non-current reversing, polarity reversing mode to selectively charge and discharge the coil.

17. The system of claim 16, wherein the dc/dc converter is bi-directional and configured to regenerate the system bus.

18. The system of claim 16, wherein the boost converter comprises an inductor and a solid state switch.

19. The system of claim 18, wherein the inductor is coupled in series with a power source and the solid state switch is coupled in parallel with the power source.

20. The system of claim 16, further comprising a braking element coupled in parallel with the coil.

21. The system of claim 20, wherein the braking element comprises a resistor in series with a controllable switch.

22. A method for charging and discharging a superconducting coil comprising:
- pulse width modulating a boost switch to generate a high-voltage from a relatively low-voltage, the boost switch making up part of a boost converter;
- switching on both a first and a second solid-state switches of a low-voltage supplier bridge, the low-voltage supplier bridge being coupled to a coil, a low-voltage bus, and a high-voltage booster bridge; and
- pulse width modulating a first solid-state switch of the high-voltage booster bridge to charge the coil with a desired voltage, the booster bridge being coupled to a high-voltage bus, a low-voltage bus, and a low-voltage supplier bridge;
- switching on a second solid-state switch of the high-voltage booster bridge to discharge the coil in a non-current reversing, polarity reversing manner to an energy storage element which is coupled across the high-voltage bus; and
- controlling all switching through control signals from a controller.

23. The method of claim 22, further comprising turing on a discharging solid-state switch while discharging the coil, the discharging solid-state switch being coupled in series with a discharging resistor and in parallel with the energy storage element.

24. The method of claim 22, further comprising turning on braking controllable switch during discharge, the braking thyristor being coupled in series with a resistor and in parallel with the coil.

* * * * *